P. HADNAGY.
ANTISKIDDING DEVICE.
APPLICATION FILED OCT. 30, 1916.
1,234,896.
Patented July 31, 1917.
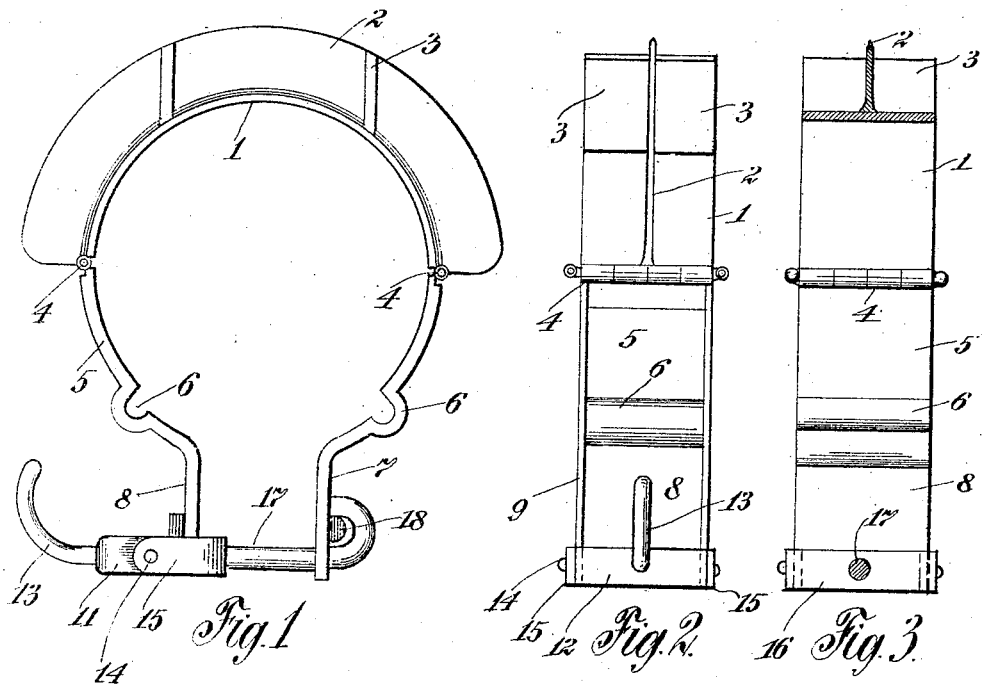
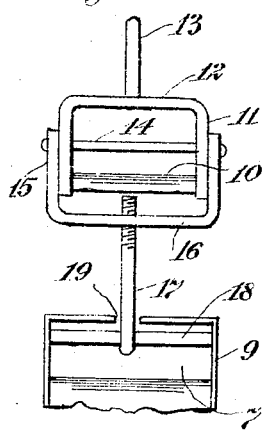
Witness
Charles Balg
Karl H. Butler
Inventor
Peter Hadnagy
By
Attorney

UNITED STATES PATENT OFFICE.

PETER HADNAGY, OF DETROIT, MICHIGAN.

ANTISKIDDING DEVICE.

1,234,896.  Specification of Letters Patent.  Patented July 31, 1917.

Application filed October 30, 1916. Serial No. 128,383.

*To all whom it may concern:*

Be it known that I, PETER HADNAGY, a subject of the Emperor of Austria, residing at Detroit, in the county of Wayne and State of Michigan, have invented certain new and useful Improvements in Antiskidding Devices, of which the following is a specification, reference being had therein to the accompanying drawings.

This invention relates to an anti-skidding device, and my invention aims to provide a device that may be easily and quickly attached to the periphery of a vehicle wheel to prevent the wheel from sliding or skidding upon smooth surfaces. A plurality of the devices may be used on the periphery of a wheel and the devices have been designed for the wheels of pleasure and commercial vehicles. In either instance, the devices provide clearance for a quick detachable or demountable rim, and the devices are held without injury to pnueumatic or solid tires of the vehicle wheel.

My invention further aims to accomplish the above results by a simple, durable and inexpensive construction which will be hereinafter specifically described and then claimed, and reference will now be had to the drawing, wherein—

Figure 1 is a front elevation of an antiskidding device in accordance with my invention;

Fig. 2 is a side elevation of the same;

Fig. 3 is a vertical sectional view of the anti-skidding device; and

Fig. 4 is a plan of a fastener for the antiskidding device.

In the drawing, 1 denotes a semi-cylindrical band or tire member provided with a central longitudinal outstanding rib 2, and spaced transverse ribs 3, the ribs 2 and 3 being integral with each other and with the tire member. The ribbed tire member is of sufficient width to prevent cutting or tearing of the tire on which it is mounted, and the ribs of the tire member are adapted to engage in a smooth surface and prevent a wheel equipped with the member from sliding or skidding when in operation.

Hinged or pivotally connected to the ends of the tire member, as at 4, are rim engaging members 5 having offset portions 6 adapted to provide clearance for the clencher edges of the quick detachable or demountable rim. The rim engaging members terminate in arms 7 and 8 and said rim engaging members and the arms thereof are strength reinforced or stiffened by side flanges 9.

The outer side of the arm 8 has an enlargement 10 and pivotally connected thereto are the side arms 11 of an operating yoke 12, said yoke having a suitable curved handle 13. Pivotally connected to the side arms 11 of the yoke 12 by a transverse rod 14 are the side arms 15 of a hook yoke 16, said hook yoke having an adjustable hook 17.

The outer side of the arm 7 is provided with a transverse rib 18 and the end of the arm is slotted, as at 19, to provide clearance for the adjustable hook 17, so that said hook may engage over the rib 18 of the arm 7.

The arms 7 and 8 are of sufficient length to permit of the adjustable hook 17 extending transversely of a wheel rim or felly, and it is through the medium of the yokes 12 and 16 that the adjustable hook 17 may draw the arm 7 toward the arm 8 and thus clamp or fasten the rim members 5 on a wheel to hold the ribbed member transversely of the tire.

What I claim is:—

A tightening device for members, comprising a yoke having side arms pivotally connected at the side edges of one of said members, a handle carried by said yoke, a hook yoke having side arms pivotally connected to the side arms of the first mentioned yoke, an adjustable hook carried by said hook yoke, and a rib on the other member adapted to be engaged by said hook.

In testimony whereof I affix my signature in the presence of two witnesses.

PETER HADNAGY.

Witnesses:
KARL H. BUTLER,
ANNA M. DORR.

Copies of this patent may be obtained for five cents each, by addressing the "Commissioner of Patents, Washington, D. C."